Aug. 5, 1941.          E. W. STACEY          2,251,470
ROTARY TOOLHOLDER
Filed Aug. 4, 1939
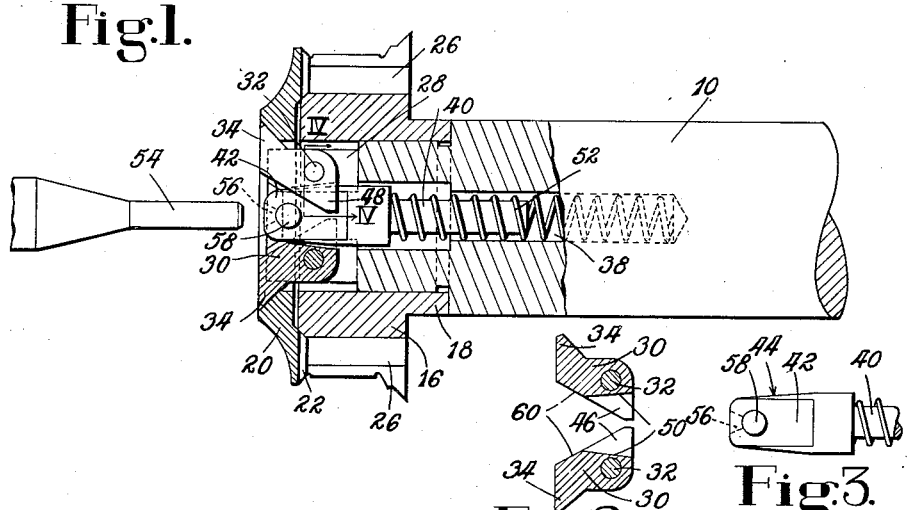
Fig.1.
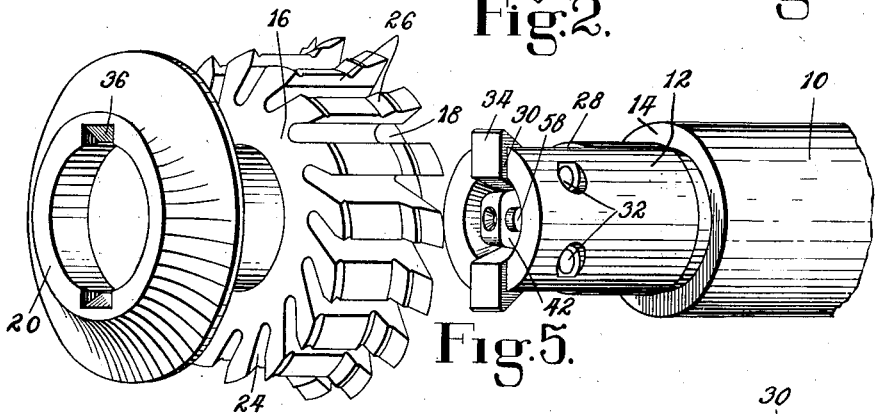
Fig.2.    Fig.3.
Fig.5.
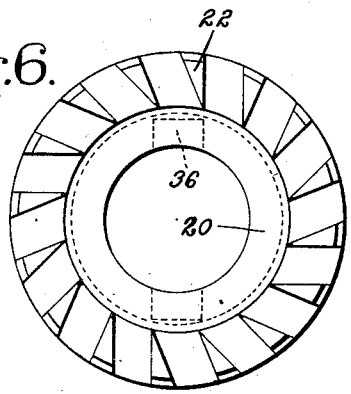
Fig.6.
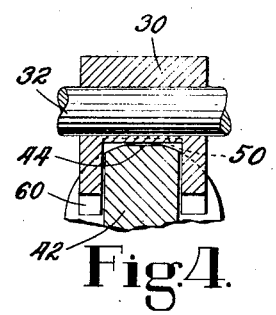
Fig.4.
INVENTOR
Ernest W. Stacey
By his Attorney
Victor Cobb Patented Aug. 5, 1941

2,251,470

UNITED STATES PATENT OFFICE 2,251,470

ROTARY TOOLHOLDER

Ernest W. Stacey, Beverly, Mass., assignor to United Shoe Machinery Corporation, Borough of Flemington, N. J., a corporation of New Jersey Application August 4, 1939, Serial No. 288,388

8 Claims. (Cl. 287—53)

This invention relates to improvements in holders for rotary tools and is herein illustrated, by way of example but not of limitation, as embodied in a machine for trimming the edges of soles in the manufacture of shoes.

The cutters used in such machines usually have a large number of teeth, which are backed off to provide a cutting clearance, and because of this backing off, when the tool is sharpened by grinding the leading edges of the teeth, one tooth is usually left longer than the rest. Since the cutter rotates at between 8000 and 12000 R. P. M. the high tooth does the major part of the cutting and so becomes dull quickly, thus in effect dulling the whole cutter. For this reason, it is frequently necessary to remove the tool from the shaft in order to resharpen it, and sometimes this must be done as many as twenty times a day. It is also necessary to change cutters when the character of the work requires a differently shaped cutter.

The manner in which the cutters have heretofore usually been held on the shaft, namely, by means of a screw makes it necessary to use one hand to hold the shaft against rotation while the other is used to turn the screw. Moreover, the number of turns required to put a screw in and take it out consume a substantial amount of the operator's time.

It is accordingly an object of the present invention to provide a rotary tool holder which will save time in attaching and detaching a tool. Another object is to insure positive control of a tool by the holder to which the tool is attached.

With a view to accomplishing these objects, the invention provides a shaft having a recess in the end thereof, pawls carried by the shaft and arranged in the recess thereof to lock the tool to the shaft, and means for moving the pawls into and retracting them from their tool-engaging positions.

The invention will be better understood when considered with relation to the accompanying drawing in which—

Fig. 1 is a side elevation, partly in section, of the tool holder and tool;

Fig. 2 is a detail view, in cross section, of the separable pawls;

Fig. 3 is a detail view of the plunger head;

Fig. 4 is a cross section along the lines IV—IV of Fig. 1;

Fig. 5 is an exploded isometric view of the holder and the tool; and

Fig. 6 is a view of the back of the shield portion of the tool.

The illustrated device with which the holder is used comprises a two-part tool consisting of a shield portion and an operating portion, the latter being shown herein as a cutter. A rotary shaft 10 has its tool-receiving end 12 reduced in diameter to form a shoulder 14, and the cutter portion 16 of the tool is slipped over the end 12 of the shaft so that its hub 18 rests against the shoulder 14. Mounted on the end of the shaft and outwardly of the cutter portion is a shield portion 20, the inner face of which has a number of teeth 22 which fit into slots 24 between teeth 26 of the cutter portion, so that the shield portion and the cutter portion will be interlocked when assembled.

Two pawls 30, arranged in a diametrical slot 28 in the shaft, are connected to the shaft by pivot pins 32. When the parts are assembled in their normal relations the ends 34 of these pawls drop into shouldered recesses 36 in the shield 20. The pawls and the shield are thus interlocked to provide a positive driving connection. At the same time the pawls press the shield axially against the cutter. The cutter is thereby pressed against the shoulder 14 and this pressure maintains interlocked relation of the shield and the cutter. The positively driven shield is thus used to rotate the cutter.

To provide for rocking the pawls on their pivot pins 32, the shaft is provided with an axial bore 38 in which a plunger 40 is arranged to slide. Two cam surfaces 44, constituting a wedge, are formed on the head 42 of the plunger, and they engage faces 50 of the pawls to tilt the latter to their locking positions when the plunger is thrust ahead by a compression spring 52. The head 42 occupies notches 46 in the pawls.

Instantaneous release of the members 20 and 16 is effected when the plunger is pressed inwardly as by a pin 54 held in the hand. To this end the head of the plunger is provided with a cross pin 58 the ends of which project to engage the faces 60 of the pawls and thereby wedge apart the inner ends of the pawls. When the plunger is pressed inwardly, the pawls are first released by the cam surfaces 44 and then, as the plunger continues to move in, the cross pin 58 separates the inner ends of the pawls. The outer ends 34 of the pawls are thus disengaged from the recesses 36 and shifted toward the axis of the shaft. Now, the members 20 and 16 may be removed along the pin 54.

From the foregoing it will readily be seen that the wedge action of the plunger head will hold the pawls positively in the recesses 36 of the shield and will transmit rotary movement of the shaft to the shield, but the latter may be quickly removed from the shaft by pressing the plunger inwardly. Thus, much of the operator's time heretofore wasted in removing and replacing tools will be saved.

Although the invention has been set forth as embodied in a two-part tool including a shield portion and a cutter portion, it should be understood that the invention is not limited in its application to the particular tool which has been shown and described.

Having thus described my invention, what I claim as new and desire to secure by Letters Patent of the United States is:

1. A holder for an annular tool comprising a rotatable shaft having a diametrical slot in one end thereof, radially movable pawls carried in said slot and constructed and arranged to engage said tool and to impart rotary movement of said shaft to said tool, means for wedging said pawls in tool-engaging position, and operator-actuated means for positively moving said pawls toward one another to retract them from tool-engaging position.

2. A holder for an annular tool which consists of a shield portion having recesses therein and an operating portion, said holder comprising a rotatable shaft, a diametrical slot in one end of said shaft, radially movable pawls carried in said slot and constructed and arranged to engage the recesses in said shield portion and to impart rotary movement of said shaft to said shield portion, means for rigidly holding said pawls in shield-engaging position, means for preventing axial movement of the tool away from said pawls, and operator-actuated means for positively retracting said pawls from shield-engaging position.

3. A holder for an annular tool comprising a rotatable shaft having a shoulder constructed and arranged to prevent axial movement away from the end of said shaft of a tool mounted on said shaft, a diametrical slot in the end of said shaft, pawls mounted in said slot for pivotal radial movement therein, said pawls having tool-engaging portions thereon, a spring-pressed plunger extending axially into said shaft beyond said slot and having a tapered portion constructed and arranged to hold said pawls in tool-engaging position, and means integral with said plunger constructed and arranged positively to retract said pawls when said plunger is moved axially into said shaft.

4. A holder for an annular tool which consists of a shield portion and an operating portion, said holder comprising a rotatable shaft having a bore concentric with its axis, a plunger carried in said bore for axial movement therein, radially movable pawls carried in said shaft adjacent said plunger, said pawls having portions to engage said shield portion and also having portions to be engaged and operated by said plunger, and a spring arranged in said bore to shift said plunger in a direction to separate said pawls, said plunger having means to retract the pawls when it is moved in the opposite direction.

5. In combination, a rotatable shaft having a diametrical slot in the end thereof, an annular tool mounted on said shaft, means for preventing axial movement of said tool away from the end of said shaft, separable pawls carried in said slot for pivotal radial movement therein, a shield recessed to receive said pawls and thereby to be rotated with said shaft, means for rigidly holding said pawls in separated position, and means integral with said shield for transmitting rotary movement of said shield to said tool.

6. In combination, a rotatable shaft having a recess in the end thereof, a tool mounted on said shaft, a shoulder on said shaft constructed and arranged to prevent axial movement of said tool away from the end of said shaft, separable pawls mounted in said recess for pivotal radial movement therein, a spring-pressed plunger extending into and co-axial with said shaft, said plunger having a tapered portion constructed and arranged to hold said pawls in separated position, and means integral with said plunger constructed and arranged positively to retract said pawls when said plunger is moved axially into said shaft.

7. In combination, a rotatable shaft having a diametrical slot in the end thereof, an annular tool mounted on said shaft, said tool consisting of a shield portion and an operating portion interlocked therewith, means for preventing axial movement of said tool away from the end of said shaft, a pair of separable pawls pivoted in said slot for radial movement therein, a spring-pressed plunger extending axially into said shaft and having a tapered portion constructed and arranged to hold said pawls in separated position, recesses in the outer surface of said shield portion constructed and arranged to receive said pawls, and operator-actuated means for positively retracting said pawls thereby to release said tool.

8. A holder for an annular tool, said holder comprising a rotatable shaft having a cylindrical portion to receive the tool, a shoulder to contact with one end of the tool and a recess in the end of said shaft, pawls mounted in the recess, and means acting upon the pawls to cause them to engage the other end of the tool and exert pressure endwise of the tool to hold the tool against the shoulder.

ERNEST W. STACEY.